United States Patent [19]

Dumas et al.

[11] 4,192,730

[45] Mar. 11, 1980

[54] CARBONACEOUS LUTING PASTE AND AMBIENT TEMPERATURE LUTING PROCESS

[75] Inventors: Daniel Dumas, Saint-Priest; Serge Lacroix, Lyons; Jean Vallon, Andresy, all of France

[73] Assignee: Societe des Electrodes et Refractaires Savoie, Paris, France

[21] Appl. No.: 31,952

[22] Filed: Apr. 20, 1979

[30] Foreign Application Priority Data

Apr. 20, 1978 [FR] France ............................... 78 12447
Feb. 19, 1979 [FR] France ............................... 79 04769

[51] Int. Cl.$^2$ ............................................. C25C 7/00
[52] U.S. Cl. ..................... 204/294; 106/209; 106/281 R; 106/284; 106/162; 106/123 R; 106/123 TQ; 106/123 LC
[58] Field of Search ............ 204/294; 106/209, 123 R, 106/123 TQ, 123 LC, 162, 281, 284

[56] References Cited

U.S. PATENT DOCUMENTS

| | | | |
|---|---|---|---|
| 2,890,128 | 6/1959 | Bushong et al. | 106/80 |
| 2,941,893 | 6/1960 | McConnaughay | 106/137 TQ |
| 3,303,031 | 2/1967 | Shields | 106/56 |
| 3,976,494 | 8/1976 | Wallouch | 106/123 LC |
| 4,032,653 | 6/1977 | Dell | 204/294 |
| 4,072,599 | 2/1978 | Bullough et al. | 204/294 |

FOREIGN PATENT DOCUMENTS 1552933  12/1968  France .

*Primary Examiner*—R. L. Andrews
*Attorney, Agent, or Firm*—Dennison, Dennison, Meserole & Pollack

[57] ABSTRACT

A carbonaceous paste is disclosed which is used at ambient temperature without need for prior heating. The paste contains: at least 70% of calcined carbonaceous material; a low-temperature plasticizing agent such as molasses, a sugar, an alginate or a lignosulfonate; and a high-temperature plasticizing agent such as a dry pitch. The paste is used in particular for luting aluminum electrolysis cells.

14 Claims, No Drawings

CARBONACEOUS LUTING PASTE AND AMBIENT TEMPERATURE LUTING PROCESS

BACKGROUND OF THE INVENTION

1. Field of the Invention

The composition and the process which are the subject of the present invention concern a novel type of carbonaceous paste which is suitable for cold shaping, and its mode of use.

Generally, it is known for carbonaceous pastes to be used for forming a lining of carbonaceous materials in chambers which are to be used for containing all kinds of solid, liquid or gaseous materials which are often raised to high or very high temperatures, which materials comprise solid, liquid or gaseous alloys or metals, molten slags, molten electrolytes, etc. The carbonaceous pastes can also be used for forming vessels of carbonaceous materials, which are intended to contain corrosive materials such as acids, bases or salts and all kinds of corrosive compounds, in the solid or liquid state, at ambient temperature or at a temperature close to ambient temperature or at a relatively low temperature.

The vessel linings comprising carbonaceous materials may be formed entirely by applying a layer of carbonaceous paste according to the invention, in a suitable thickness, or by setting carbonaceous blocks, the jointing of which is effected by means of the carbonaceous paste according to the invention.

The jointing process is often referred to as luting, particularly when producing the carbonaceous coatings which line the bottom and the walls of aluminum electrolysis cells. The term luting is then used to denote the carbonaceous paste employed. The luting must be able to penetrate to the bottom of the spaces which occur between the carbon blocks. It must also wet the surface of the blocks, by penetrating into all their interstices. Finally, during a baking operation, the luting must be progressively converted into a carbonaceous residue which, in the manner of a cement, provides a solid bond between the adjacent carbonaceous blocks. It must also be possible for such a paste to be applied to all sorts of substrates, for example non-carbonaceous refractory materials or metal walls and, in this case also, it must be possible for the paste after baking to be converted into a stable self-sustaining rigid carbonaceous layer which adheres to the substrate on which it is deposited.

2. Description of the Prior Art

For making such linings, it is known to use carbonaceous pastes comprising a mixture of particles of coke, graphite and/or calcined anthracite, and/or other forms of calcined carbon, with a carbonaceous binding agent containing a petroleum and/or coal tar pitch and possibly a tar, with a softening point which is higher than ambient temperature. In general, so that such pastes can be compacted, they must be pre-heated to a temperature above 100° C. Achieving good densification of the paste, which is absolutely necessary to achieve an optimum level of properties after baking, requires the use of suitable tools such as hammer-type or vibrating plate-type tools, and careful work. In particular, the paste must be maintained at a sufficient temperature for it to remain plastic throughout the period that it is being set in position.

Experience shows that this requirement for keeping the carbonaceous paste at a temperature higher than ambient temperature gives rise to serious difficulties.

Firstly, the hot paste gives off vapors which originate from the hydrocarbon binding agents which it contains. The vapors emitted by the tars and pitches are generally considered as being toxic and the safety and health regulations which prevail in various countries are becoming increasingly stringent as regards levels of concentration of such vapors in the atmosphere of the workshops and acceptable periods of time of exposure thereto. This means that it is necessary to have recourse to means for protecting the workers who are required to put the hot pastes in place, and such means often interfere with the careful and proper production of the linings.

In addition, it is necessary to have the required amount of paste at the desired temperature, at the moment at which it is required, and this necessitates careful pre-heating and mixing for the appropriate temperature level to be achieved throughout the quantity of paste involved. As the paste is being set in position, it rapidly cools in contact with the ambient air and the materials with which it is to be joined, e.g., carbonaceous blocks, metal walls or the like. In many cases, such localized cooling prevents the paste from penetrating into the interstices of the walls with which it is in contact, and limits its densification. This results in a defective joint which will subsequently result in cracking and perhaps even a rupture in the lining. Such phenomena can be particularly serious, for example when jointing carbonaceous blocks which line the bottom of an aluminum electrolysis cell. Indeed, during the operating life of the cell, the lining is in contact with liquid aluminum which is heated up to about 300° C. above its melting point, and which therefore takes every opportunity to penetrate through the slightest crack. In order to remedy these difficulties, it is often necessary for not only the paste but the whole mass of the cathodic chamber and the carbon blocks which line the chamber to be pre-heated. This however is a long and expensive operation.

Finally, at least a part of the paste which has been pre-heated for example for the purpose of producing a plurality of joints between carbonaceous blocks will not be used in the required period and will consequently undergo cooling so that it cannot be used.

In order to remedy some of these difficulties, it has been proposed that a solvent which permits the pitch contained in the carbonaceous paste to remain plastic at ambient temperature, may be mixed with the pitch. Thus, U.S. Pat. No. 4,032,653 proposes producing the luting in aluminum electrolysis cells by using a carbonaceous paste whose pitch-base binding agent is made plastic at temperatures close to ambient temperature, by the addition of a solvent. The solvents used for this purpose are aromatic hydrocarbons with a boiling point of from 150° to 350° C., such as methylnaphthalenes. The examples show that a carbonaceous paste of this kind can effectively be used for luting carbonaceous blocks, at temperatures of the order of about 25° C. Unfortunately, even at these relatively low temperatures, methylnaphthalenes have relatively substantial vapor pressures and using a carbonaceous paste containing same encounters serious restrictions set by the health and safety regulations in force. In addition, when the ambient temperature falls substantially below 25° C., the plasticity of such paste falls fairly rapidly. Later, at the time of heating, i.e., baking, the linings which are thus formed all the aromatic solvent is given off into atmosphere and the problem of collecting it to minimize pollution again arises.

French Pat. No. 2,255,395 proposes a carbonaceous paste which can be shaped at ambient temperature and which contains a furane derivative and a pitch, with a high softening point, which is in powder form. Partial dissolution of the pitch in the furane gives the paste a sufficient degree of plasticity for it to be used at ambient temperature. After a certain period of time the paste hardens under the action of a catalyst which is contained in the dry materials. Just as when using a methylnaphthalene as the plasticizing agent, using furane derivatives also encounters the restrictions which are imposed by health and safety considerations. Indeed, the vapors emitted by furanes are dangerous to inhale, even at ambient temperature.

In addition, the presence of a catalyst in the carbonaceous paste, which causes the furane derivative to harden by polymerization, means that the paste must be shaped in a very short period of time after mixing. All this explains why the only use for such a carbonaceous paste, which is described in French Pat. No. 2,255,395, is the production of carbonaceous blocks by pressure molding a mixture comprising carbon grains which are partially impregnated with alkaline materials which act as a catalyst for polymerization of the furane derivative. It is known that, in practice, time restrictions would not make it possible to use a paste of this type for lining a vessel or for jointing carbonaceous blocks.

SUMMARY OF THE INVENTION

The novel carbonaceous paste which is the subject of the present invention makes it possible to overcome the different problems which had hitherto remained unsolved.

The carbonaceous paste of the invention is a carbonaceous paste which, by virtue of its plasticity at ambient temperature, can be used without any preheating for all the uses of conventional carbonaceous pastes and in particular for jointing carbonaceous blocks.

This paste is made plastic at ambient temperature by means of compounds which are not derivatives of petroleum or coal tars and which are virtually not volatile in the vicinity of ambient temperature and consequently do not give rise to any danger in regard to respiration. For these reasons, use of this paste is not subject to any preventive or limiting conditions from the point of view of health and safety regulations.

Moreover, as will be seen hereinafter, this paste has a very long shelf life, provided that it is stored in watertight packages such as plastic bags. Indeed, compounds in aqueous solution are used as the cold plasticizing agent. By virtue of the characteristics of such compounds and the use of sealed bags, once the carbonaceous paste has been prepared, it becomes available at any moment, even after prolonged storage, and it can be used immediately without fresh mixing or re-heating.

A significant aspect of the invention, and one of the essential advantages of using a compound in solution in water as an ambient-temperature plasticizing agent is that it permits the use, in a conventional manner as a high-temperature plasticizing agent, of dry tars or other water-insoluble organic compounds. This therefore avoids any interaction, during cold working, between the low and high temperature plasticizing agents, which prevents degradation of the desirable properties of the carbonaceous paste during prolonged storage.

DETAILED DESCRIPTION OF THE INVENTION

The carbonaceous paste according to the invention therefore comprises an ambient-temperature plasticizing agent which comprises an aqueous solution of certain mineral or organic compounds. Preferred compounds are those, which, after baking, have a fixed carbon residue such as compounds which are extracted from certain plants or which result from the treatment thereof. Such compounds are primarily alginates, lignosulfonates, molasses and sugars. They may be used separately or in association with each other. Thus, good results are obtained by using aqueous solutions which contain both one or more alkaline lignosulfonates and a certain proportion of molasses. The amount of aqueous solution contained in the paste is from about 8 to 15% by weight, the best results being obtained with approximately 11 to 13%.

The high temperature plasticizing agent contained in the carbonaceous paste is a dry tar, i.e., coal tar pitch, in powder form, with a softening point of higher than 100° C. The tar may be replaced totally or partially by certain thermoplastic resins such as phenol-formaldehyde resins which are also used in powder form, to enable good distribution during the mixing operation. It is also possible to use other water-insoluble resins that are thermoplastic prior to baking of the luting.

As used herein, the term dry tar includes pitch obtained from coal tar and the similar products obtained from petroleum which dry tar or pitch is generally solid at ambient temperature. Such dry tar and pitches are characterized by their softening point, which parameter may be determined by the Kraemer and Sarnow method.

The proportion of high-temperature plasticizing agent in the carbonaceous paste is generally from 6 to 15% by weight and preferably from 7 to 13%. The proportions of high-temperature and low-temperature plasticizing agents must be adjusted, as is well known to one of ordinary skill in the art, depending upon the nature, e.g., particle size and porosity of the calcined carbonaceous materials contained in the paste. Such carbonaceous materials are graphites, cokes, calcined anthracites, calcined carbons, waste from pre-baked graphite or carbon blocks or waste from carbon or graphite electrodes, which are used separately or in mixture depending on the characteristics which are to be imparted to the carbonaceous paste. Their total content in the paste is generally at least equal to 70% by weight.

Besides these three constituents, the carbonaceous paste optionally may contain very small quantities of various additivies, the concentration of which does not generally exceed a few percent. Thus, it is optionally possible to add anti-mildew preserving agents to the paste, when the aqueous plasticizing solution contains sugars.

As indicated hereinbefore, utilization of the carbonaceous paste according to the invention makes it possible to produce carbonaceous coatings for various uses. As will be seen hereinafter, after baking, the ambient temperature shapable carbonaceous pastes according to the invention have mechanical characteristics and other properties which are at least the equal of those of prior art conventional hot shapable pastes or previously described cold shapable pastes that evolve potentially harmful vapors.

The following non-limiting examples describe embodiments of the composition and process according to the invention.

EXAMPLE 1

The process according to the invention is applied to luting an industrial aluminum electrolysis cell.

The total amount of carbonaceous paste required for luting the cell was about 3T.

The carbonaceous paste was prepared in the following manner: a mixture comprised as follows was cold mixed for a period of 5 minutes:

780 kgs of grains of calcined anthracite, of maximum sizes of less than 15 mm;

100 kgs of pitch in powder form, grains smaller than 0.5 mm; with a softening point of 120° C., as measured by the Kraemer and Sarnow method.

120 kgs of a molasses having a viscosity of 50 poises at 20° C. was then added and mixing was resumed for 20 minutes. The paste was then packed in 30 kg aliquots in plastic bags.

A quantity of 3T of paste required for luting the cell was obtained from several batches each of which was prepared in the above-described manner.

Several weeks after the paste had been prepared, the paste was used in the following manner: the bags which had been brought to the edge of the cell were simply opened and then emptied into the joints between the carbonaceous blocks which had been previously set in place.

At the moment of filling the joints by means of the carbonaceous paste, the ambient temperature was about 10° C.

By virtue of the granular nature of the product, the product is easily introduced right into the narrowest interstices. The paste was then compacted in situ in successive layers by means of pneumatic hammers provided with the tools usually employed.

The particular characteristics of the carbonaceous paste according to the invention made it possible to carry out the operation without any pressure of time, and without odor, and the compacting operation could be interrupted at any moment, to be subsequently resumed, without detriment to the final quality of the joints.

The electrolysis cell after luting in the above-described manner was then started up in the usual way. After operation for 16 months without any incident, it was found that there had not been any infiltration of molten aluminum through the luting support substrate at the bottom of the cell.

Separate tests carried out on the same carbonaceous paste showed that, after baking, the paste had a resistance to crushing of more than 250 kg/cm$^2$ and a deformation on the Rapoport test of 1.2%.

In-depth tests have shown that if the carbonaceous luting paste described in Example 1 gives excellent results when filling relatively narrow joints between carbonaceous blocks, the results are less favorable when the joints are of large width. Thus, when luting the cathode of an industrial high-power aluminum electrolysis cell, it is a particularly delicate operation to form the wide joint which joins, at the four sides of the cell, the bottom and the side walls. This joint which often reaches from 20 to 30 cm in width often has a transverse slope of the order of 45° or more with respect to the horizontal. Experience shows that, in operation of the cell, this joint is in contact sometimes with liquid aluminum which is often involved in translatory movements at a greater or lesser speed, and sometimes with the electrolyte which may itself be alternatively liquid or solid. Under such conditions, the abrasion and compression resistance characteristics are not always at a sufficiently high level after baking of the carbonaceous paste.

It has been found that it was possible further to improve specifically these two characteristics, by avoiding in particular excessive swelling of the paste when baking is effected at very high speed.

For that purpose, it was firstly found that it was possible to avoid swelling of the paste during the baking operation by limiting the water content to below 5%. In the meantime, if it is desired that the paste can be put into a sufficiently solid form, it is necessary to use a sufficient quantity of a plasticizing agent in aqueous solution, with an excellent agglomerating capacity. It is known moreover that any addition of non-carbonaceous plasticizing element such as clay results in an unacceptable reduction, after baking, in the resistance to chemical attack by liquid aluminum and also very substantially reduces the electrical conductivity and the mechanical characteristics. It was found that it was possible to combine an excellent degree of shapability and a low degree of swelling, by using, as the ambient-temperature plasticizing agent, solely molasses or a sugar such as glucose or a mixture of molasses and sugar, in solution in an amount of water which is as limited as possible. Under such conditions, it was found that the proportion of aqueous solution of molasses and/or sugar in the carbonaceous paste could be limited to a maximum value of 13% by weight. Moreover, the water content of the carbonaceous paste must itself be limited to the amount required for providing adequate viscosity of the solution of molasses and/or sugar and in any case less than 5%.

Under practical conditions, the amount of water used is as small as possible, while being compatible with an acceptable viscosity. Preferably, the water content of the carbonaceous paste produced does not exceed 3% by weight. As has been stated hereinbefore, the carbonaceous paste comprises at least 70% of calcined carbonaceous materials and from 6 to 15% of a high-temperature plasticizing agent comprising pitch and/or a thermoplastic resin. Other tests have shown that it was possible to produce a carbonaceous luting paste according to the invention having even better characteristics in regard to resistance to crushing after baking, by using as the carbonaceous material in its composition, totally or at least for the major part, crushed waste from pre-baked graphite or carbon blocks such as those used for constructing the cathodes of aluminum electrolysis cells, or for the internal lining of furnaces such as blast furnaces or electrothermy furnaces, or waste from graphite or carbon electrodes. Such crushed waste has the advantage of comprising a base material, of anthracite and/or coke which has already been agglomerated with pitch and then pressed and subsequently calcined, which has substantially reduced its porosity and increased its mechanical strength. Such waste material may comprise production rejects or may be recovered in the course of demolition of the carbonaceous linings of furnaces which are no longer in use. In the case of cathode blocks of aluminum electrolysis cells however, it is advisable to avoid using waste from blocks which contain excessive amounts of fluorine compounds. These can possibly be extracted for preliminary treatment. It is also possible to use, instead of waste, a coke and/or anthracite based carbonaceous material which is bound with pitch and which will have been especially produced, then calcined and finally crushed, to arrive at comparable characteristics.

Finally, in order to increase the mechanical characteristics obtained after baking, it is desirable to increase the proportion of fines which are smaller than 0.25 mm in the carbonaceous materials which are incorporated in the luting paste. This proportion is preferably higher than 50% and may range up to about 80% by weight, the remainder comprising grains of from 0.25 to 5 or 10 mm approximately. A mode of production of such a paste is described hereinafter:

EXAMPLE 2

A carbonaceous paste according to the invention is prepared, which contains in percent by weight: 80% of crushed waste from pre-baked carbonaceous blocks resulting from production rejects of blocks for cathodes for aluminum electrolysis cells. One third of the crushed waste had a grain size of from 10 to 0.25 mm while two thirds were fines smaller than 0.25 mm; 12% of an aqueous glucose solution with 20% of water by weight; 8% of dry pitch.

This mixture was suitably worked. Samples were then taken off, which, after having been set in place in a mold at ambient temperature by means of pneumatic hammers identical to those normally used when luting cathodes for aluminum electrolysis cells, were baked up to a temperature of 950° C. Crushing tests were then carried out on the specimens. It was found that their levels of resistance to crushing reached 300 bars.

In addition, the level of deformation on the Rapoport test was lower than 1%. These results show the entirely exceptional performance levels of a luting paste according to the invention. As stated above, such a paste can be used for a very large number of uses. It is suitable in particular for making joints of substantial width. It may also be used in any case where there is a requirement for very good resistance to crushing and to erosion, together with a very small degree of swelling during the baking operation. Such a paste is also suitable for lining the channels and runners for casting liquid alloys and metals and also for forming all or part of furnace linings.

One of the essential advantages of the carbonaceous paste described in Example 2 is that the exceptionally high levels of mechanical characteristics obtained are achieved, by avoiding the introduction of any non-carbonaceous compound or mixture of compounds, at least a part of which would remain integrated into the carbonaceous material after baking. Indeed, adding for example clay to carbonaceous pastes as a plasticizing agent makes it possible to achieve relatively high levels of mechanical characteristics. However, after baking, the chemical inertness of the product obtained is much less and in particular it no longer has sufficient resistance to attack by liquid alloys or metals which have a strong reducing action, such as aluminum. In addition, its electrical resistivity is considerably increased.

Moreover, the carbonaceous paste according to the invention has the advantage that it makes it possible to avoid losses, by using only precisely the amounts required. By virtue of being packed in sealed bags, the unused bags can be stored for very long periods, for subsequent use. In order to prevent the formation of mildew, a preserving agent may be added to the carbonaceous paste. The amount introduced must be as small as possible.

The carbonaceous paste according to the invention is suitable for a great number of other uses. In particular, it can be used for partially or totally lining or covering all kinds of vessels which are intended to contain products at elevated temperature in the solid, liquid or gaseous state. Such linings or coverings may comprise carbon blocks which are jointed by means of the carbonaceous paste according to the invention. The linings or coverings can also be formed by means of a continuous layer of carbonaceous paste which is deposited on a suitable substrate. The carbonaceous paste can also be used to cover any sort of apparatus for casting liquid metals, such as runners, channels, casting ladles, etc.

Finally, the paste can be used for the partial or total covering of vessels intended to contain corrosive materials of all kinds, whether solid, liquid or gaseous, and at any temperature.

We claim:

1. A carbonaceous luting paste capable of being cold shaped, essentially comprising at least about 70% by weight of particulate calcined carbonaceous material, a high-temperature plasticizing agent comprising a water-insoluble organic carbonaceous compound, and an ambient-temperature plasticizing agent comprising a compound in aqueous solution.

2. A carbonaceous paste according to claim 1 wherein the ambient-temperature plasticizing agent is present in a concentration wherein the water content of the paste does not exceed about 5% by weight.

3. A carbonaceous paste according to claim 2 wherein the water content is limited to about 3% by weight, the content of aqueous solution of ambient-temperature plasticizing agent does not exceed about 13% by weight.

4. A carbonaceous paste according to claim 1 wherein the ambient-temperature plasticizing agent is an aqueous solution of a compound selected from the group consisting of molasses, sugar, alginate, lignosulfonate and mixtures thereof.

5. A carbonaceous paste according to claim 1 wherein the high-temperature plasticizing agent is selected from the group consisting of a water-insoluble thermoplastic resin, pitch and mixtures thereof.

6. A carbonaceous paste according to claim 1 comprising from 8 to 15% by weight of ambient-temperature plasticizing agent and from 6 to 15% by weight of high-temperature plasticizing agent.

7. A carbonaceous paste according to claim 1 wherein the carbonaceous materials contained therein are selected from the group consisting of waste from pre-baked graphite or carbon blocks.

8. A carbonaceous paste according to claim 1 wherein the particulate calcined carbonaceous materials contained therein comprise from 50 to 80% of fines which are smaller than 0.25 mm.

9. A carbonaceous paste according to claim 1 including an anti-mildew preserving agent.

10. In a process for forming carbonaceous linings intended to be baked, and comprising linings at least partially produced by utilization of a carbonaceous paste the improvement comprising applying at ambient temperature, without preliminary heating of the paste, paste substrate or the materials with which the paste is brought into contact, a carbonaceous paste capable of being cold shaped and essentially comprising at least about 70% by weight of calcined particulate carbonaceous material, a high-temperature plasticizing agent comprising a water-insoluble organic carbonaceous compound, and an ambient-temperature plasticizing agent comprising a compound in aqueous solution.

11. A process according to claim 10 wherein the carbonaceous lining which is formed comprises pre-baked carbon blocks which are disposed side-by-side and which are jointed by filling the spaces, at ambient temprature, with said carbonaceous paste.

12. The process of claim 10 carried forth for luting aluminum electrolysis cells.

13. The process of claim 10 carried forth for forming linings for runners or channels for casting liquid alloys or metals.

14. The process of claim 10 carried forth for forming furnace linings comprising a generally monalithic layer of said carbonaceous paste.

* * * * *